United States Patent [19]

Jones et al.

[11] 4,004,958

[45] Jan. 25, 1977

[54] METHOD AND APPARATUS FOR PRODUCING BETTER BALANCED TREAD COMPONENTS IN PNEUMATIC TIRES

[75] Inventors: Billy Joe Jones; Donald James Linnstaedter; Freydoun Monajjem, all of Waco, Tex.

[73] Assignee: The General Tire & Rubber Company, Akron, Ohio

[22] Filed: Aug. 15, 1975

[21] Appl. No.: 605,105

[52] U.S. Cl. .......................... 156/128 R; 156/405; 152/354

[51] Int. Cl.² ......................................... B29H 17/20

[58] Field of Search ... 156/75, 96, 123 R, 126–129, 156/405, 394; 301/5; 152/354

[56] References Cited

UNITED STATES PATENTS

| | | | |
|---|---|---|---|
| 1,679,560 | 8/1928 | Burdette | 156/96 |
| 2,429,032 | 10/1947 | Sheahan | 156/75 |
| 2,690,785 | 10/1954 | McWilliams | 156/128 |
| 2,995,177 | 8/1961 | Tolonen | 156/394 |
| 3,007,511 | 11/1961 | Barns et al. | 156/394 |
| 3,048,211 | 8/1962 | Cuthbertson | 156/75 |
| 3,250,841 | 5/1966 | Reinhart | 156/128 |
| 3,725,163 | 4/1973 | Hofelt | 156/96 |
| 3,847,705 | 11/1974 | Habert et al. | 156/96 |

Primary Examiner—Charles E. Van Horn
Assistant Examiner—John E. Kittle

[57] ABSTRACT

A method and apparatus for fabricating a laminated band of vulcanizable elastomeric material to be shaped and molded into a pneumatic tire. After the tire carcass is formed a specially prepared extruded strip of tread material of predetermined length is applied and lap spliced at its ends. Prior to its application to the carcass, the strip is longitudinally foreshortened or shrunk to form a slightly thickened portion midway between its ends. After the tire is vulcanized the thickened portion is located approximately 180° circumferentially from the zone of the splice to counterbalance the weight at the zone of the lap splice.

6 Claims, 9 Drawing Figures

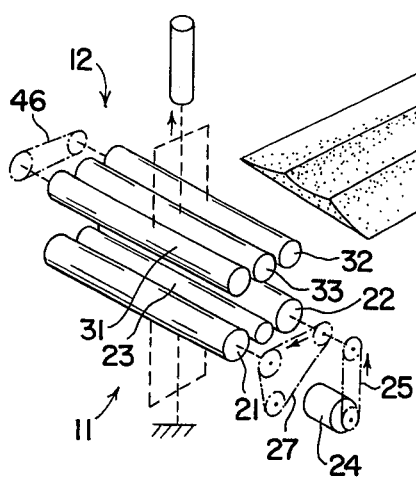
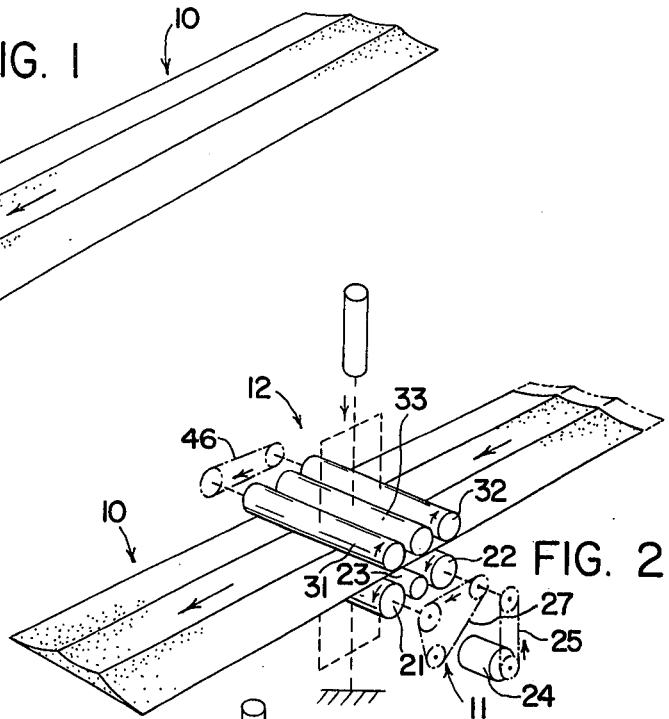
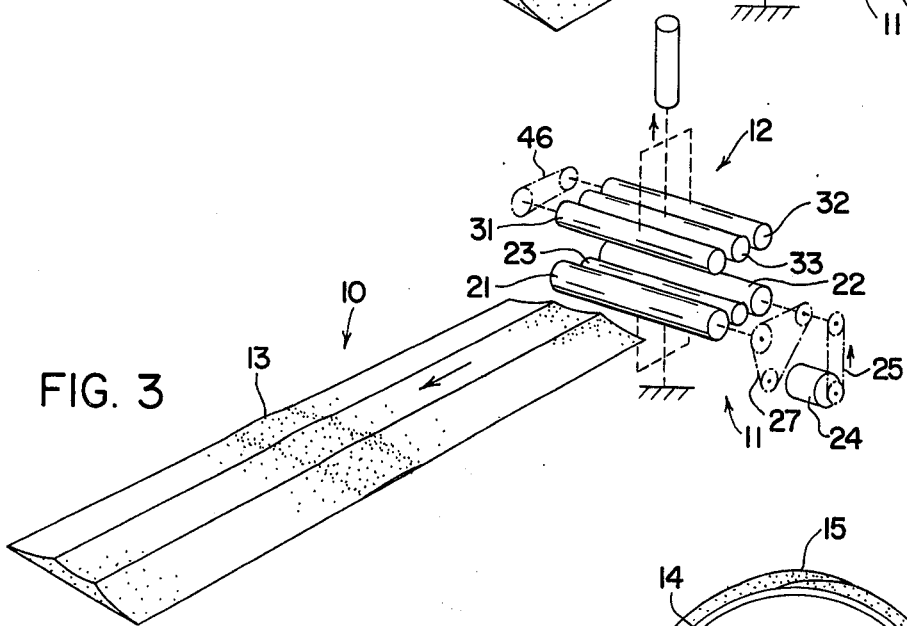
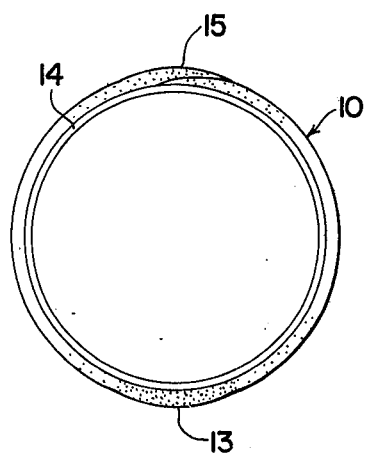

METHOD AND APPARATUS FOR PRODUCING BETTER BALANCED TREAD COMPONENTS IN PNEUMATIC TIRES

BACKGROUND OF THE INVENTION

This invention relates to the construction of pneumatic tires and especially to the forming of superposed carcass plys, sidewall strips and an extruded tread strip into a laminated band that is subsequently shaped and vulcanized to form a pneumatic tire. More particularly, the invention relates to a novel means for forming the tread portion of the tire to provide improved balance.

In the construction of pneumatic tires, particularly tires of larger bead radius, an imbalance frequently occurs due to the extra weight in the zone of the tread splice. The imbalance is either due to the splicing operation during assembly of the tire and/or free shrinkage of the cut-to-length tread strip near the free ends after cutting. Normally an extruded, cut-to-length strip of uncured tread rubber is wrapped around the tire carcass during fabrication, usually over one or more breaker strips, and then lap spliced at its ends. The extra weight in the area of the tread splice creates an imbalance in the finished tire or stated another way causes the center of mass of the tire to be disadvantageously spaced from the geometric axis of the tire.

This problem becomes more significant in tires of larger size such as passenger car tires of sizes "G" and above.

The method and apparatus of the present invention, however, improve the balance of the tire by counterbalancing the extra weight in the zone of the tread strip splice, and afford other features and advantages heretofore not obtainable.

SUMMARY OF THE INVENTION

It is among the objects of the invention to improve the static balance of pneumatic tires.

Another object of the invention is to compensate for the imbalance produced in a pneumatic tire due to the splicing of the cut-to-length tread strip during the fabrication prior to curing.

Still another object of the invention is to form an enlarged thickened portion in a cut-to-length strip of extruded tread material so that when the tread strip is applied to a tire carcass and lap spliced, an area of increased weight is located 180° from the area of the splice to counterbalance the extra weight at the splice zone.

These and other objects and advantages are achieved through the unique method and apparatus of the invention as used in the process of fabricating a band of uncured elastomeric material for vulcanizing in a mold to form a pneumatic tire. The band is formed by constructing a carcass of superposed plys and applying a cut-to-length extruded vulcanizable strip around the carcass and lap splicing it at its ends. The improvement of the invention comprises foreshortening the tread strip to form a slightly thickened portion midway between the ends thereof. Accordingly, when the strip is applied to the carcass and the laminated product is vulcanized in a mold, the thickened portion is located approximately 180° from the zone of the splice to counterbalance the extra weight in the splice zone.

In accordance with the apparatus of the invention special provision is made for longitudinally foreshortening the strip and advancing the extruded length of deformable vulcanizable elastomeric material to form a slightly thickened portion midway between the ends thereof. The apparatus includes a first pair of parallel rolls selectively engageable with the length of tread stock to advance the tread stock therebetween, and a second pair of parallel rolls laterally spaced from the first pair of rolls and selectively engageable with the length to advance the length therebetween. Both pairs of rolls are driven by a special drive means that drives the first pair of rolls at a speed to advance the length at a rate slower than the second pair of rolls so that the length is foreshortened longitudinally and a slightly thickened portion is formed therein between the pair of rolls. Also, a special means is provided for selectively moving pairs of rolls into operating engagement with the length during an appropriate interval to form the thickened portion at a predetermined position.

BRIEF DESCRIPTION OF THE DRAWINGS

FIGS. 1, 2 and 3 are perspective views partly in diagrammatic form illustrating sequentially the method of the invention, for longitudinally foreshortening an extruded length of vulcanizable tire tread material;

FIG. 4 is a side elevation illustrating a laminated band of vulcanizable material constructed in accordance with the invention and adapted to be shaped and cured in a vulcanizing mold to form a pneumatic tire;

DESCRIPTION OF THE PREFERRED EMBODIMENT

Figure 5:
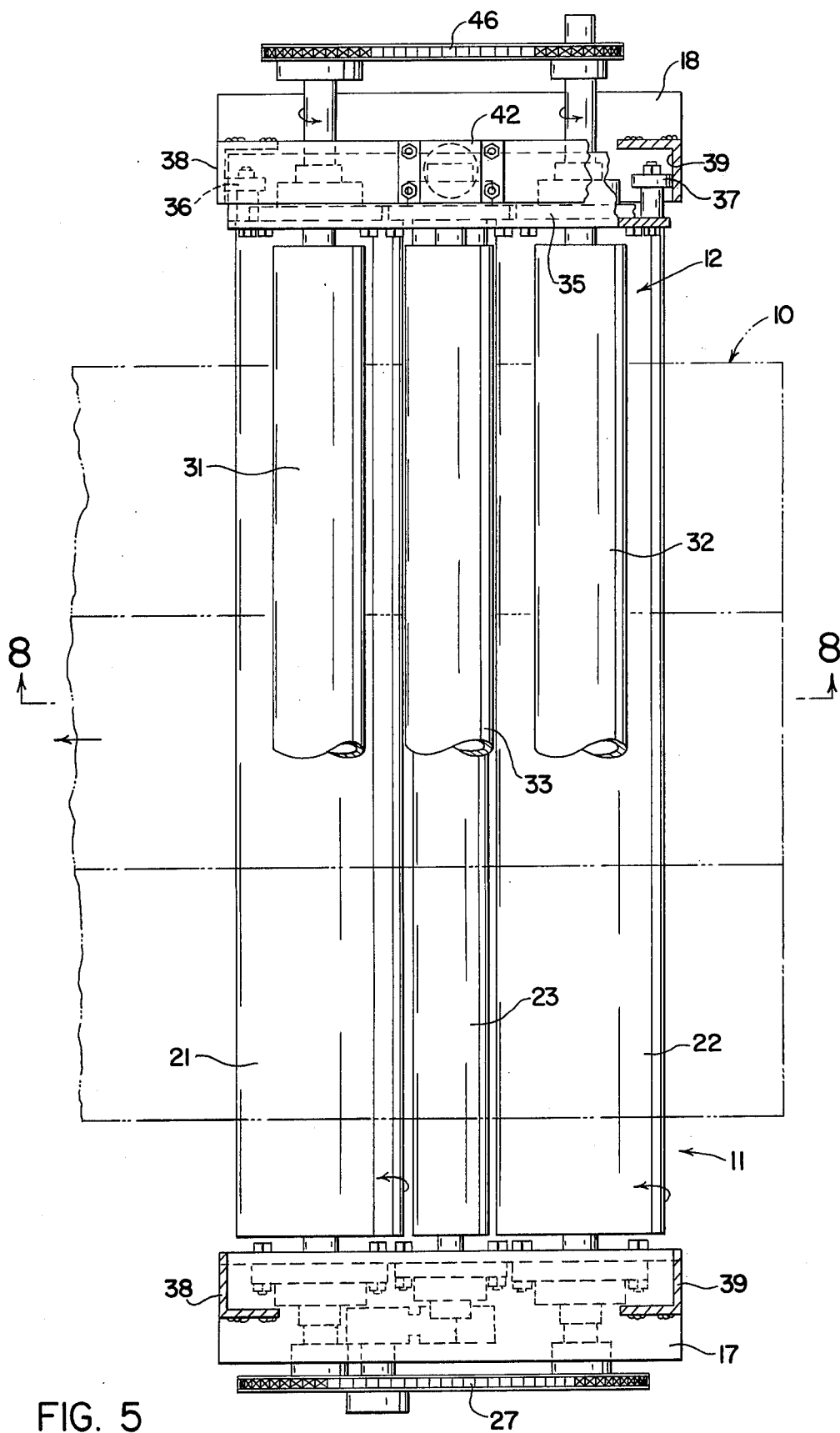
FIG. 5 is a fragmentary plan view of an apparatus embodying the invention taken from the line 5—5 of FIG. 6, with parts broken away for the purpose of illustration.
Figure 6:
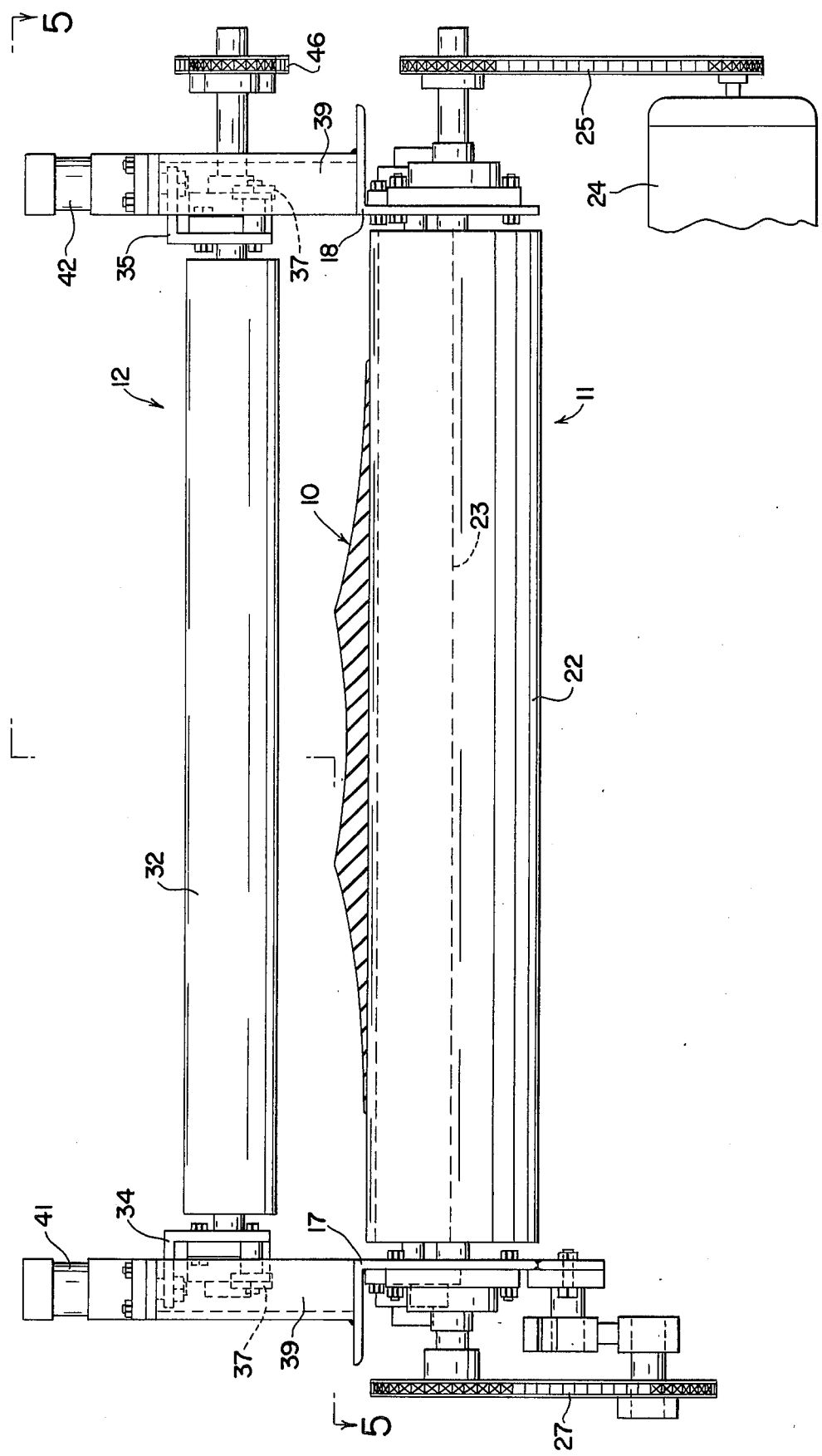
FIG. 6 is a sectional view taken on the line 6—6 of FIG. 7.
Figure 7:
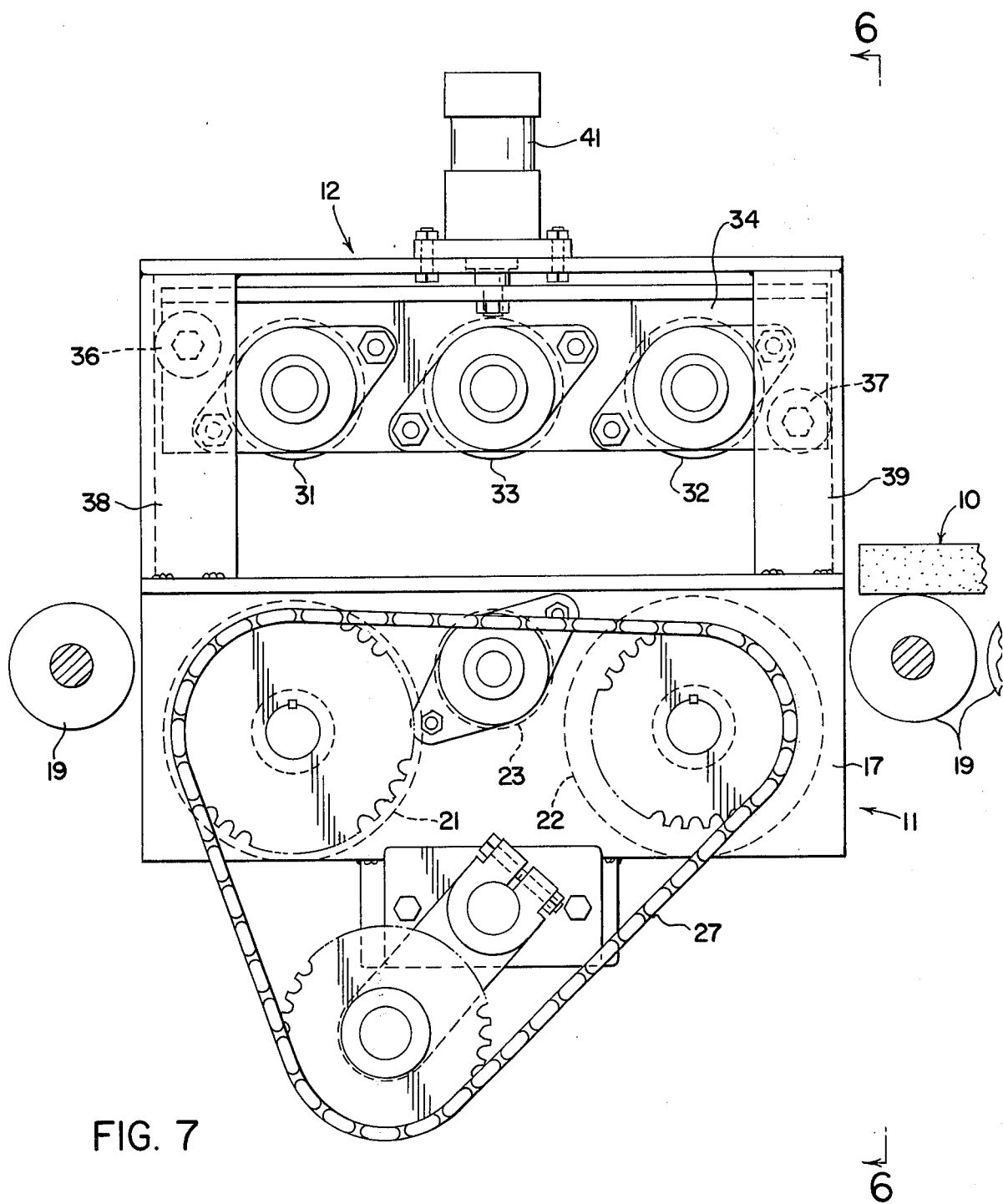
FIG. 7 is an end elevation of the apparatus of FIGS. 5 and 6.

Referring more particularly to the drawings and initially to FIGS. 1 to 4, there is shown sequentially a typical procedure in a tire manufacturing process for improving the static balance of the tires by counterbalancing the heavy circumferential portion normally produced at the location of the tread splice. In accordance with the improved method of the invention an extruded strip of vulcanizable tread rubber which has been cut-to-length according to the particular dimensions of the tire, is longitudinally foreshortened. The operation is performed in the embodiment illustrated by a stationary lower roller assembly 11 cooperable with a movable upper roller assembly 12. The strip 10 is advanced between the assemblies 11 and 12 and during a desired time interval, the upper roll assembly 12 is lowered into operating engagement with the strip 10 (FIG. 2) cooperating with the stationary lower roll assembly 11 to form a slightly thickened central portion 13. This results in longitudinal shortening of the strip 10 which is necessary in order to produce the desired thickened portion 13. The strip 10 is then wrapped around a laminated carcass band 14 and lap spliced as indicated at 15. As will be seen in FIG. 4 the thickened portion 13 is circumferentially spaced approximately 180° from the zone of the splice 15 in order to counterbalance the extra weight of the tread adjacent the splice.

Referring to FIGS. 5 through 9 which illustrate the apparatus of the invention and the operation thereof, it will be seen that the stationary lower roll assembly 11 is supported by mounting members 17 and 18 spaced on opposite sides of a conveyor assembly including conveyor rolls 19, along which the tread strip 10 is advanced. The members 17 and 18 have journal bearings bolted thereon for rotatably supporting the shafts of lower driven rolls 21 and 22 and lower idler roll 23.

The rolls 21 and 22 are driven through a motor 24 (FIG. 6) that drives a chain 25 extending to a sprocket secured to the shaft for the roll 22. At the left hand end of the assembly as viewed in FIG. 6, a chain 27 driven by a sprocket on the shaft for the roll 22, turns another sprocket fixed to the shaft for the roll 21. The diameters of the sprockets and/or the rolls 21 and 22 are such that the surface speed of roll 21 is slower than the surface speed of the roll 22 (at a ratio of approximately 1 to 1.25).

The upper roll assembly 12 has two idler rolls 31 and 32 of equal diameter and an idler roll 33 located therebetween and also having the same diameter. The rolls 31 and 32 may be connected by means of sprockets and chain in which case the speed of the roll 31 is slower than that of the roll 32 by a ratio of approximately 1 to 1.33. The shafts of the rolls 31, 32 and 33 are journaled at each end thereof in carriages 34 and 35, each of which has guide rollers 36 and 37 that engage and travel in vertical stationary tracks 38 and 39 that are welded to the mounting plates 17 and 18 respectively at each end. Accordingly, the rolls 31, 32 and 33 are movable between a raised retracted position illustrated in solid lines in FIGS. 7 and 8 and an extended position illustrated in dashed lines in FIG. 8 and in solid lines in FIG. 9. The carriages 34 and 35 are moved vertically by means of air cylinders 41 and 42 mounted on plates welded to the respective tracks 38 and 39. The piston rods of the cylinders 41 and 42 are connected to the respective carriages 34 and 35. The cylinders 41 and 42 may be substituted with only one cylinder of adequate size moving both end carriages 34 and 35 and connected by means of a rack and pinion assembly or other similar method.

A chain 46 connects the rolls 31 and 32 together through their respective sprockets, the diameters of the sprockets being such that the roll 32 turns at a slower speed than 31. The speed ratio therebetween is approximately 1 to 1.33.

OPERATION

Figure 8:
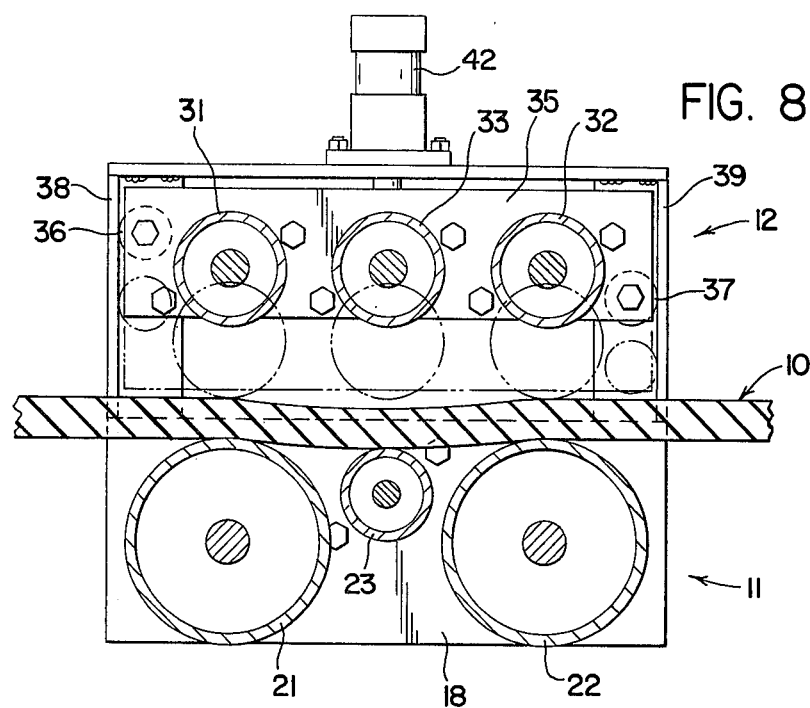
FIGS. 8 and 9 are sectional views taken on the line 8—8 of FIG. 5 and illustrating the operation of the apparatus of the invention.
Figure 9:
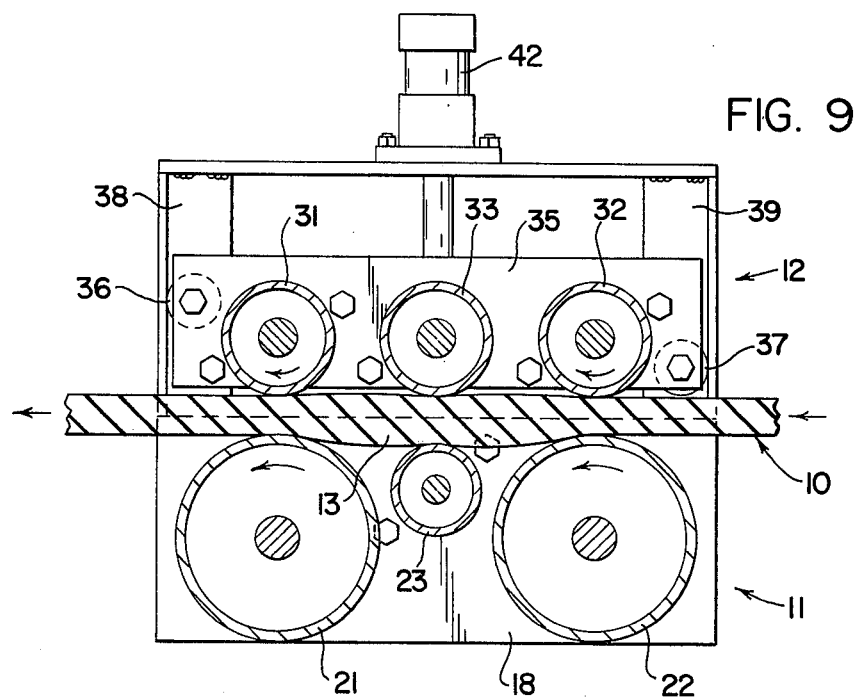

The operation of the apparatus of FIGS. 5 through 9 is best illustrated in FIGS. 8 and 9. Initially, the upper roll assembly 12 is in its raised retracted position illustrated in solid lines in FIG. 8 so that the rolls 31, 32 and 33 are spaced well above the lower rolls 21 and 22. An extruded strip 10 of tread material, cut to the desired length for the particular tire for which it is to be used, is advanced along a suitable conveyor means so that the leading edge thereof passes between the roller assemblies 11 and 12.

At the appropriate time, during the passage of the strip 10 between the assemblies 11 and 12, the air cylinders 41 and 42 are operated to extend the upper roll assembly 12 downwardly into operating position as illustrated in dashed lines in FIG. 8 and in solid lines in FIG. 9. As the strip 10 moves across the lower rolls 21 and 22, the roll 22 turns at a greater speed than the roll 21 so that some slippage occurs. As the upper idler rolls 31 and 32 come into operating position relative to the respective lower rolls 21 and 22, they grip respective portions of the strip 10 therebetween. As indicated above, the surface speeds of the rolls 32 and 22 advance the strip 10 therebetween at a faster rate than the rolls 31 and 21. It will be noted that initially a greater clearance occurs between the idler rolls 23 and 33 than between the driven rolls, so that they do not grip the strip 10. Due to the difference in surface speeds, however, the strip is longitudinally shortened and a slightly thickened portion 13 develops midway between the ends thereof as illustrated in FIG. 9. This continues until a desired thickness for the portion 13 is achieved. The slight thickening of the material will cause the rubber to engage both the idler rolls 23 and 33, however, these rolls prevent any buckling of the material that might otherwise occur.

After the longitudinal shortening or shrinking of the strip 10 and the development of the thickened portion 13 has been accomplished according to predetermined conditions, the cylinders 41 and 42 are again operated to raise the upper roll assembly 12 to the retracted position shown in solid lines in FIG. 8. With this, the strip 10 continues to advance between the assemblies 11 and 12 until the trailing end thereof exits the apparatus. The apparatus is then ready to receive and perform its operation on additional strips being advanced thereto.

The strip 10 formed as indicated in FIG. 3 with a slightly thickened portion 13 midway between its ends is then applied to a laminated band of carcass plys as illustrated in FIG. 4 and lap spliced at its ends. The lap splicing and shrinkage of ends after initial cutting creates a thickened weighted portion of the tread, however, this is counterbalanced by the thickened portion 13 which is located circumferentially approximately 180° from the location of the splice. This serves to produce a tire having improved static balance as indicated in the discussion above.

It will be understood that the apparatus illustrated in FIGS. 5 through 9 represents only one means for practicing the method of the invention and that other means for providing the longitudinal shortening and resulting thickened portion between the ends of a cut-to-length strip of tread material may be used in accordance with the invention.

It will be understood that the invention has been shown and described with respect to a specific embodiment of the method and apparatus thereof and that other modifications and variations will be apparent to those skilled in the art all within the intended spirit and purpose of the invention. Accordingly the patent is not to be limited to the specific forms herein shown and described nor in any other way that is inconsistent with the extent to which the progress in the art has been advanced by the invention.

We claim:

1. In a method for fabricating a laminated band of uncured elastomeric material for vulcanizing in a mold, to form a pneumatic tire, including the steps of constructing a carcass of superposed plies and applying thereto a cut-to-length extruded vulcanizable strip that is wrapped around the carcass and lap spliced at its ends, the improvement which comprises:
    before said strip is applied to said carcass, longitudinally shortening said strip to form a thickened portion midway between the ends thereof whereby when said strip is applied to said carcass and said laminated band is vulcanized, said thickened portion is located 180° from the zone of the splice to counterbalance the extra weight of said splice zone.

2. A pneumatic tire constructed in accordance with the method of claim 1.

3. Apparatus for longitudinally shortening an advancing extruded length of vulcanizable elastomeric material to form a thickened portion midway between the ends thereof, comprising:
 first and second pairs of parallel rolls selectively engageable with said length to advance said length therebetween,
 means for driving said first and second pairs of rolls whereby said first pair advances said length at a rate faster than said second pair so that said length is longitudinally shortened and a thickened portion is formed therein between said pairs of rolls, and
 means for selectively moving said pairs of rolls into operating engagement with said length whereby to form said thickened portion at a predetermined location.

4. Apparatus as defined in claim 3 including means located between said pairs of rolls to prevent buckling of said strip between said rolls as said strip is shortened.

5. Apparatus as defined in claim 4 wherein said buckling preventing means comprises two idler rolls parallel to said first and second pairs of rolls and located on opposite sides of said strip.

6. Apparatus for longitudinally shortening an advancing cut-to-length strip of uncured extruded elastomeric material to form an enlarged thickened portion midway between the ends thereof, comprising:
 a stationary roll assembly including parallel first and second laterally spaced driven rolls,
 a movable roll assembly including parallel first and second laterally spaced rolls parallel to said stationary roll assembly driven rolls,
 said movable rolls being movable between a retracted position spaced from said length and an operating position whereby said movable rolls cooperate with the respective driven rolls to grip said length therebetween to advance it longitudinally, and
 means for turning said first driven rolls at a rate more than said second driven rolls whereby when said movable roll assembly is in its operating position, said length is longitudinally shortened and a thickened portion is formed in the moving length midway between the ends thereof.

* * * * *

UNITED STATES PATENT AND TRADEMARK OFFICE
CERTIFICATE OF CORRECTION

PATENT NO. : 4,004,958
DATED : January 25, 1977
INVENTOR(S) : B. J. Jones, D. J. Linnstaedter, F. Monajjem It is certified that error appears in the above-identified patent and that said Letters Patent are hereby corrected as shown below:

Column 3, line 46, which reads: "32" should read --31--

Column 3, line 47, which reads: "31" should read --32--

Signed and Sealed this

Second Day of May 1978

[SEAL]

Attest:

RUTH C. MASON
Attesting Officer

LUTRELLE F. PARKER
Acting Commissioner of Patents and Trademarks